(12) United States Patent
Diekmann et al.

(10) Patent No.: US 8,453,518 B2
(45) Date of Patent: Jun. 4, 2013

(54) INDUCTIVE TORQUE SENSOR

(75) Inventors: Jörg Diekmann, Bielefeld (DE); Roman Schamne, Lippstadt (DE)

(73) Assignee: Hella KGAA Hueck & Co., Lippstadt (DE)

( * ) Notice: Subject to any disclaimer, the term of this patent is extended or adjusted under 35 U.S.C. 154(b) by 229 days.

(21) Appl. No.: 12/865,515

(22) PCT Filed: Jan. 29, 2009

(86) PCT No.: PCT/EP2009/051009
§ 371 (c)(1),
(2), (4) Date: Jul. 30, 2010

(87) PCT Pub. No.: WO2009/095442
PCT Pub. Date: Aug. 6, 2009

(65) Prior Publication Data
US 2010/0319467 A1    Dec. 23, 2010

(30) Foreign Application Priority Data

Jan. 31, 2008  (DE) .................. 10 2008 006 865

(51) Int. Cl.
*G01L 3/00*    (2006.01)
(52) U.S. Cl.
USPC ..................................................... 73/862.08
(58) Field of Classification Search
USPC .......... 73/862.08, 862.826, 862.331–862.334
See application file for complete search history.

(56) References Cited

U.S. PATENT DOCUMENTS

| 3,936,680 | A | * | 2/1976 | Kuwako et al. | ......... 310/40 MM |
| 4,868,443 | A | * | 9/1989 | Rossi | ............................ 310/268 |
| 4,918,997 | A | | 4/1990 | Pouillange | |
| 4,983,915 | A | * | 1/1991 | Rossi | ....................... 324/207.17 |
| 5,260,635 | A | * | 11/1993 | Bahn | ............................. 318/701 |
| 6,653,828 | B2 | | 11/2003 | Dordet et al. | |
| 7,446,447 | B2 | * | 11/2008 | Takeuchi | ..................... 310/112 |

FOREIGN PATENT DOCUMENTS

| DE | 19738836 A1 | 3/1999 |
| DE | 199 41 464 A1 | 3/2001 |
| DE | 10156238 A1 | 6/2003 |
| DE | 20313045 U1 | 10/2003 |
| DE | 102004027954 A1 | 12/2005 |
| EP | 1081454 A1 | 3/2001 |
| EP | 1312889 A2 | 5/2003 |
| EP | 1666836 A2 | 6/2006 |

* cited by examiner

*Primary Examiner* — Max Noori
(74) *Attorney, Agent, or Firm* — Husch Blackwell LLP; Robert C. Haldiman; H. Frederick Rusche

(57) ABSTRACT

An inductive torque sensor for a motor vehicle is provided that has an excitation coil, an oscillator circuit which is coupled with the excitation coil and which generates a periodic alternating voltage signal and couples it with the excitation coil during operation, a stator circuit board with first receiver means and second receiver means with each having a number of periodically repeated receiver structures, at least two rotors which can be rotated relative to one another and relative to the stator circuit board and which influence the strength of the inductive coupling between the excitation coil and the receiver means, and evaluation means suitable for evaluation of the signals induced in the receiver means.

10 Claims, 1 Drawing Sheet

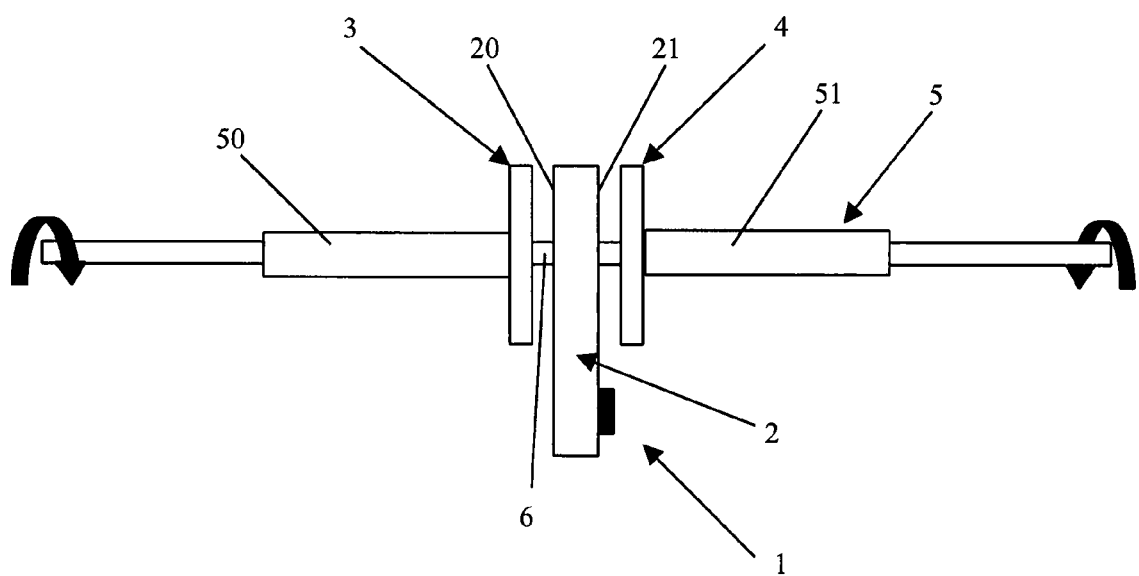

INDUCTIVE TORQUE SENSOR

CROSS REFERENCE TO RELATED APPLICATIONS

This application is a U.S. National Phase Application of International Application PCT Application No. PCT/EP2009/051009 filed on Jan. 29, 2009, which claims the benefit of priority from German Patent Application No. 10 2008 006865.9 filed on Jan. 31, 2008. The disclosures of International Application PCT Application No. PCT/EP2009/051009 and German Patent Application No. 10 2008 006865.9 are incorporated herein by reference.

The present invention relates to an inductive torque sensor, comprising at least one excitation coil, at least one at least one oscillator circuit which is connected to the excitation coil and which generates a periodic alternating voltage signal and couples it into the excitation coil during operation, a stator circuit board with a first receiver means and a second receiver means, which each have a number of periodically repeated receiver structures, at least 2 rotors which can be rotated relative to one another and relative to the stator circuit board and which influence the strength of the inductive coupling between the excitation coil and the receiver means and an evaluation means suitable for the evaluation of the signals induced in the receiver means.

In innovative steering systems for motor vehicles, the normally used hydraulic power steering systems are gradually replaced by electrically driven power steering systems. This requires suitable toque sensors, which can sense the steering moment. The steering moment is usually determined by the torsion of a certain section of the steering column, in which a torsion element is arranged. Herein, the torsion of two steering column sections relative to one another is measured without the absolute angle position of the steering column relative to the motor vehicle having to be determined.

State-of-the-art inductive torque sensors suitable for the determination of the steering moment usually measure the torsion inside the steering column by means of sensor means executed in two parts. Under the influence of a torsion moment, the two parts rotate relative to another in a torsion movement and also rotate jointly during the steering movement. To contact at least one part of the sensor means, a moving contact comprising a so-called clockspring is required. For design reasons it is desirable to do without such a clockspring.

From the state-of-the-art a method is already known, wherein the absolute angle position of the two steering column sections relative to the vehicle is measured and the torsion relevant for the steering moment is determined from the difference between two absolute angle positions.

A torque sensor of the type initially named is for example known from the German Patent DE 199 41 464 A1. Herein, two receiver coils with different angle periodicities being in a non-integer ratio relative to one another, are arranged approximately on one plane. A first rotor of the inductive torque sensor is arranged at one end of the torsion element and a second rotor is arranged at the opposed end of the torsion element. The torque can be determined by calculating the difference between the measured angles. It has, however, become evident, that the application of the angle difference method in the sensor arrangement described in the above Patent may possibly be a source of errors and can therefore have a negative influence on the measurement result, as the receiver means arranged (approximately) on one plane affect one another. For this reason, the measurement results do often show grave measuring errors.

This is where the present invention comes in.

The present invention is based on the task of providing an inductive torque sensor of the type described initially, in which the reachable measurement accuracy in the calculation of the difference of the measured angle values can be augmented and the effort required for the determination of the torque can be reduced.

This task is solved by means of an inductive torque sensor of the type mentioned initially with the characteristics of the characterizing part of claim 1. The subclaims describe advantageous developments of the invention.

According to claim 1, an inductive torque sensor according to the invention is characterized in that the number N of the receiver structures of the first receiver means and the number M of the receiver structures of the second receiver means are in an integer ratio relative to one another. It has been detected, that, surprisingly, the measuring errors in the angle measurement differences can be reduced due to the integral ratio of the number N of the receiver structures of the first receiver means to the number M of the receiver structures of the second receiver means (the numbers of the receiver structures of the two receiver means must not be identical, however). By this means, the influence of faults can be favorably minimized not only over a full circle (360°), but already at much smaller angles. Preferably the receiver structures of the first and/or the second receiver means are designed as receiver coils, each comprising a periodically repeated loop structure.

In an especially preferred execution it is proposed that the number N of the receiver structures of the first receiver means is in a ratio of 2:1. It has been detected, that surprisingly in such a ratio the achievable measurement accuracy is particularly high and therefore the measuring errors correspondingly small.

In an advantageous execution there is the possibility that the first rotor has a number N' of rotor segments. The number N' of rotor segments does herein correspond to the number N of the receiver structures of the first receiver means.

In an advantageous execution there is furthermore the possibility that the second rotor has a number M' of rotor segments. The number M' of rotor segments does herein correspond to the number M of the receiver structures of the second receiver means.

The receiver structures of the first receiver means can for example have an angle periodicity of 15° or 20°. The receiver structures of the second receiver means can have an angle periodicity of 30° or 40°.

In an advantageous execution there is furthermore the possibility that the rotor segments of the first rotor have an angle periodicity of 15° or 20°. In addition, it can also be provided that the rotor segments of the second rotor have an angle periodicity of 30° or 40°.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

In the following the invention is explained in more detail with the help of the enclosed drawing.

Herein,

FIG. 1 shows a schematic representation of an inductive torque sensor according to a preferred execution example of the present invention.

An inductive torque sensor 1, designed according to a preferred execution example of the present invention, comprises a stator circuit board 2 as well as a first rotor 3 and a second rotor 4, wherein the stator circuit board 2 is arranged between the two rotors 3, 4. The two rotors 3, 4 are rotatable relative to one another and relative to the stator circuit board 2. Furthermore, the inductive torque sensor 1 has an excitation coil, which is not explicitly represented here, as well as an oscillator circuit, also not explicitly represented, which generates a periodic alternating current signal and couples it into the excitation coil during the operation of the inductive torque sensor 1.

In the execution example shown here, the inductive torque sensor 1 is intended for the determination of the steering torque of a steering column 5 of a motor vehicle. The steering column 5 has a first steering column section 50 and a second steering column section 51, between which a torsion element 6 (torsion spring element) extends. The steering torque is determined by the torsion of the section of the steering column 5 in which the torsion element 6 is arranged. Herein the torsion of the two steering column sections 50, 51 relative to one another is measured, without the absolute angle position of the steering column relative to the vehicle having to be determined.

The first rotor 3 is arranged at one end of the torsion element 6 and the second rotor 4 is arranged at a second end of the torsion element 6, being opposed to the first end.

On the sides facing the two rotors 3, 4 the stator circuit board 2 has on receiver means 20, 21 each. A first receiver means 20 assigned to the first rotor 3 and facing it has a number N of periodically repeated receiver structures. A second receiver means 21 assigned to the second rotor 4 and facing it has a number M of periodically repeated receiver structures, in which the ratio of the number of the receiver structures N of the first receiver means 20 to the number of the receiver structures M of the second receiver means 21 is integer. The number of the receiver structures N of the first receiver means 20 must not, however, be identical with the number of receiver structures M of the second receiver means 21. Preferably the ratio is N:M=2:1. In this execution example the receiver structure of the first receiver means 20 has an angle periodicity of 15°. The receiver structure of the second receiver means 21 has an angle periodicity of 30°. The receiver structure of the first receiver means 20 can also have an angle periodicity of 20°, for example. At a ratio of N:M=2:1 the receiver structure of the second receiver means 21 has therefore an angle periodicity of 40. The two receiver means 20, 21 are preferably executed as receiver coils, each having a periodically repeated loop structure forming the receiver structure of the respective receiver means 20, 21.

The two rotors 3, 4 serve as rotatable inductive coupling elements, which by rotating influence the strength of the inductive coupling between the excitation coil and the receiver structures of the receiver means 20, 21 assigned to them.

The first rotor 3 has a number N' of rotor segments with the same angle periodicity as the receiver structure of the first receiver means 20 assigned to it. Accordingly, also the second rotor 4 has a number M' of rotor segments with the same angle periodicity as the receiver structure of the second receiver means 21. In other words, the first rotor 3 has N'=N rotor segments. Accordingly, also the second rotor as M'=M rotor segments. In this execution example the rotor segments of the first rotor 3 have an angle periodicity of 15° and the rotor segments of the second rotor 4 have an angle periodicity of 30°. The rotor segments of the first rotor 3 can also have an angle periodicity of 20° and the rotor segments of the second rotor 4 can have an angle periodicity of 40 °.

As mentioned above, the torsion of the two steering column sections 50, 51 of the steering column 5 (and therefore also the steering torque) can be determined by calculating the difference between the two measured angles (angle difference method). The angle positions of the two steering column sections 50, 51 before and behind the torsion element 6 respectively are herein determined independent from one another. To this end, the inductive torque sensor 1 is provided with an evaluation circuitry, here also not shown explicitly, for the evaluation of the signals induced in the receiver structures of the receiver means 20, 21 during the relative movement of the two steering column sections 50, 51.

By means of the inductive torque sensor 1 presented here, the steering moment acting upon the steering column 5 of the motor vehicle can be detected reliably and with little measuring errors. The steering moment can be transformed into angle differences by means of the torsion element 6 arranged in the steering column 5. Due to the difference in rotation of the two rotors 3, 4 during the respective steering movements, which are calculated by means of the angle difference method, the respective steering moments can be deduced.

Due to the integer ratio of the numbers N, M of the receiver structures of the two receiver means 20, 21 possible error influences can not only be reduced in an especially advantageous manner when considering the full circle (360°), but also with much smaller angles of rotation.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

LIST OF REFERENCE NUMBERS

1 Torque sensor
2 Stator circuit board
3 First rotor
4 Second rotor
5 Steering column
6 Torsion element
20 First receiver means
21 Second receiver means
50 First steering column section
51 Second steering column section

The invention claimed is:

1. An inductive torque sensor, in particular for a motor vehicle, comprising
at least one excitation coil,
at least one oscillator circuit which is coupled with the excitation coil and which generates a periodic alternating voltage signal and couples said signal into the excitation coil during operation;
a stator circuit board having a first receiver and a second receiver, each having a number of periodically repeated receiver structures;
at least two rotors which can be rotated relative to one another and relative to the stator circuit board and which influence the strength of the inductive coupling between the excitation coil and said receivers; and
an evaluation element suitable for the evaluation of the signals induced in the receivers;
wherein a number N of said receiver structures of said first receiver and a number M of said receiver structures of said second receiver are in an integer ratio, greater than one, relative to one another.

2. The inductive torque sensor according to claim 1, wherein said number N of said receiver structures of said first receiver has a ratio of 2:1 relative to said number M of said receiver structures of said second receiver.

3. The inductive torque sensor according to claim 1, further comprising said first rotor has a number N' of rotor segments.

4. The inductive torque sensor according to claim 3, further comprising said number N' of the rotor segments of the first rotor corresponds to the number N of the receiver structures of said first receiver.

5. The inductive torque sensor according to claim 1, further comprising said second rotor having a number M' of rotor segments.

6. The inductive torque sensor according to claim 5, further comprising the number M' of the rotor segments of the second rotor corresponds to the number M of the receiver structures of the second receiver.

7. The inductive torque sensor according to the claim 1, further comprising said receiver structures of the first receiver having an angle periodicity of about 15° to about 20°.

8. The inductive torque sensor according to claim 1, further comprising said receiver structures of the second receiver have an angle periodicity of about 30 to about 40°.

9. The inductive torque sensor according to claim 3, further comprising said rotor segments of the first rotor having an angle periodicity of about 15° to about 20°.

10. The inductive torque sensor according to claim 5, further comprising said rotor segments of the second rotor having an angle periodicity of about 30° to about 40°.

* * * * *

UNITED STATES PATENT AND TRADEMARK OFFICE
CERTIFICATE OF CORRECTION

| | |
|---|---|
| PATENT NO. | : 8,453,518 B2 |
| APPLICATION NO. | : 12/865515 |
| DATED | : June 4, 2013 |
| INVENTOR(S) | : Jörg Diekmann |

It is certified that error appears in the above-identified patent and that said Letters Patent is hereby corrected as shown below:

In the Specification

Column 4, line 18, delete "moments", and replace with --movements--

Signed and Sealed this
Fifteenth Day of October, 2013

Teresa Stanek Rea
*Deputy Director of the United States Patent and Trademark Office*